United States Patent [19]

Kiss et al.

[11] Patent Number: 4,806,268

[45] Date of Patent: Feb. 21, 1989

[54] LUMINESCING GLASSES

[75] Inventors: Akos Kiss, Aschaffenburg; Peter Kleinschmit, Hanau; Werner Volker, Bad Vilbel; Günter Halbritter, Schollkrippen, all of Fed. Rep. of Germany

[73] Assignee: Degussa Aktiengesellschaft, Frankfurt am Main, Fed. Rep. of Germany

[21] Appl. No.: 170,091

[22] Filed: Mar. 9, 1988

Related U.S. Application Data

[63] Continuation of Ser. No. 677,350, Dec. 3, 1984, abandoned.

[30] Foreign Application Priority Data

Dec. 23, 1983 [DE] Fed. Rep. of Germany ....... 3346686

[51] Int. Cl.$^4$ .................. C09K 11/08; C03C 8/10; C03C 3/102; C03C 3/105
[52] U.S. Cl. .................. 252/331.4 F; 501/22; 501/60; 501/61; 501/62; 501/74; 501/75
[58] Field of Search .................. 501/22, 60, 61, 62, 501/74, 75; 252/301.4 F

[56] References Cited

U.S. PATENT DOCUMENTS

| | | | |
|---|---|---|---|
| 2,097,275 | 10/1937 | Fischer | 501/61 |
| 2,655,452 | 10/1953 | Barnes et al. | 501/61 |
| 2,734,142 | 2/1956 | Barnes et al. | 501/61 |

FOREIGN PATENT DOCUMENTS

| | | | |
|---|---|---|---|
| 0084936 | 8/1983 | European Pat. Off. | 501/61 |
| 709574 | 1/1980 | U.S.S.R. | 501/61 |

OTHER PUBLICATIONS

Kreidl, N.J.; "Recent Studies on the Fluorescence of Glass", Journal of the Optical Society of America, vol. 35, No. 4, Apr. 1945, pp. 249-257.

Primary Examiner—Mark L. Bell
Attorney, Agent, or Firm—Cushman, Darby & Cushman

[57] ABSTRACT

There are described luminescent glasses having the following compositions (a) 0 to 80 mole % alkali metal oxide (sodium oxide, potassium oxide, lithium oxide), individually or several together, 0 to 30 mole % alkaline earth metal oxide (magnesium oxide, calcium oxide, strontium oxide, barium oxide), individually or several together, and at least 2 mole % of alkali metal oxide and/or alkaline earth metal oxide must be present (b)
7 to 90 mole % silica
1 to 50 mole % boron oxide ($B_2O_3$)
1 to 30 mole % aluminum oxide (c)
0.1 to 5 mole % lead oxide (PbO)
0.1 to 10 mole % vanadium pentoxide ($V_2O_5$).

The glasses have white, yellow, or blue luminescence, depending on the PbO and $V_2O_5$ content, at excitation with a wave length of 254 nm.

5 Claims, No Drawings

LUMINESCING GLASSES

This is a continuation of application Ser. No. 677,350, filed Dec. 3, 1984, which was abandoned upon the filing hereof.

BACKGROUND OF THE INVENTION

The invention is directed to luminescent glasses, especially luminescent glass frits for glazing ceramic products.

Luminophores or fluoroscent substances are materials which are capable after absorbing energy (daylight, ultraviolet rays, x-rays, etc.) of emitting light. This light emission takes place with longer wave lengths than the absorbed radiation has and occurs during the excitation itself and in differing time intervals subsequently.

According to prevailing opinion the fluorescent substances are solid, crystalline compounds in which several cations of the base material are replaced by foreign cations, whereby the built in cations with the surrounding group of anions are conceived as so-called luminous centers. By comminuting the luminescent substance crystallite the ability to luminesce of the known luminophores is completely destroyed.

Amorphous materials with luminescent substance properties theoretically do not exist. Glass-like luminescent materials therefore previously have not been known.

For the production for example of tiles having luminescent glaze coatings until now there have been fired mixtures of crystalline luminescent materials and customary glass frits. Thereby there cannot be exceeded temperatures of 700° to 800° C. since at higher temperatures which are necessary for firing on interesting glass frits, the luminescing materials are destroyed and no longer exhibit luminescent material properties.

Therefore it was the problem of the present invention to develop luminescing glasses, especially luminescing glass frits for glazing ceramic products.

SUMMARY OF THE INVENTION

This problem was solved according to the invention by glasses having the following compositions (a) 0 to 80 mole % alkali metal oxide (sodium oxide, potassium oxide, lithium oxide), individually or several together, 0 to 30 mole % alkaline earth metal oxide (magnesium oxide, calcium oxide, strontium oxide, barium oxide), individually or several together, and at least 2 mole % of alkali metal oxide and/or alkaline earth metal oxide must be present (b) 7 to 90 mole % silica, 1 to 50 mole % boron oxide ($B_2O_3$), 1 to 30 mole % aluminum oxide (c) 0.1 to 5 mole % lead oxide (PbO), 0.1 to 10 mole % vanadium pentoxide ($V_2O_5$)

Contrary to prevailing opinion, according to which only crystalline compounds are able to possess luminescent properties, these x-ray amorphous glasses surprisingly likewise exhibit luminescent properties, even if they are present in the form of glass frits.

These glasses absorb the mercury line at 366 nm and emit in the yellow region. Besides they absorb the mercury line at 254 nm and emit either white light (at $V_2O_5$ content <2 mole % and PbO content <2 mole %), or in the yellow region ($V_2O_5$ content >1.5 mole % and PbO content less than $V_2O_5$ content, or in the blue region ($V_2O_5$ content <0.5 mole % and PbO content larger than $V_2O_5$ content. By variation of the different alkaline earth metal oxide and alkali metal oxide content or their contents the emitted color can be varied to a small extent.

Preferably there are used glasses of the following compositions (a) 2 to 45 mole % alkali metal oxide, individually or several together, 0 to 20 mole % each of magnesium oxide, calcium oxide, srontium oxide, and barium oxide (b) 40 to 90 mole % silica, 1 to 20 mole % boron oxide, 1 to 10 mole % aluminum oxide (c) 0.1 to 5 mole % lead oxide, 0.1 to 5 mole % vanadium pentoxide The luminescing glasses or frits are temperature stable, acid resistant, do not lose their luminescent properties upon comminution, are transparent and colorless in daylight. Besides they can be colored.

There have proven especially preferred the following glass compositions (a) 3 to 20 mole % alkali metal oxide (b) 60 to 85 mole % silica, 5 to 15 mole % boron oxide, 1 to 15 mole % aluminum oxide (c) 0.8 to 2.5 mole % lead oxide, 0.4 to 4 mole % vanadium pentoxide The production of the glasses of the invention is carried out by melting together the components or corresponding raw products (e.g. kaolin, feldspar, quartz sand) at a temperature of to 1450° C. in a suitable furnace (gas furnace, rotary furnace, electric glass melting furnace) for 0.5 to 5 hours. To produce glass frits, the product is quenched in water.

The composition can comprise, consist essentially of, or consist of the stated materials.

The following glasses for example were produced according to these processes, which all luminesce yellow at 366 nm

EXAMPLE 1

2.0 mole % $Li_2O$. 5.5 mole % $Na_2O$, 6.5 mole % $K_2O$, 2.3 mole % MgO, 5.5 mole % CaO, 2.2 mole % SrO, 2.0 mole % BaO, 2.5 mole % $Al_2O_3$, 9.0 mole % $B_2O_3$, 61.0 mole % $SiO_2$, 1.2 mole % PbO, 0.3 mole % $V_2O_5$.

EXAMPLE 2

5.2 mole % $Na_2O$, 9.3 mole % $K_2O$, 4.0 mole % $Al_2O_3$, 12.5 mole % $B_2O_3$, 66.6 mole % $SiO_2$, 1.1 mole % PbO, 1.3 mole % $V_2O_5$.

EXAMPLE 3

10.0. mole % $K_2O$, 3.5 mole % CaO, 2.4 mole % BaO, 2.6 mole % $Al_2O_3$, 8.5 mole % $B_2O_3$, 69.0 mole % $SiO_2$, 1.8 mole % PbO, 2.2 mole % $V_2O_5$.

EXAMPLE 4

3.0 mole % $Na_2O$, 6.4 mole % $K_2O$, 1.2 mole % $Al_2O_3$, 5.1 mole % $B_2O_3$, 81.5 mole % $SiO_2$, 1.3 mole % PbO, 1.5 mole % $V_2O_5$.

EXAMPLE 5

19.0 mole % BaO, 8.0 mole % CaO, 6.2 mole % $B_2O_3$, 3.5 mole % $Al_2O_3$, 62.0 mole % $SiO_2$, 0.9 mole % PbO, 0.4 mole % $V_2O_5$.

EXAMPLE 6

15.0 mole % BaO, 7.0 mole % CaO, 8.4 mole % $B_2O_3$, 4.0 mole % $Al_2O_3$, 63.3 mole % $SiO_2$, 0.8 mole % PbO, 1.5 mole % $V_2O_5$.

EXAMPLE 7

9.8 mole % $K_2O$, 12.4 mole % BaO, 5.1 mole % CaO, 5.4 mole % $B_2O_3$, 3.0 mole % $Al_2O_3$, 62.9 mole % $SiO_2$, 1.0 mole % PbO, 0.4 mole % $V_2O_5$.

At an excitation with 254 nm glasses 2, 4, 6 luminesce white, glass 3 yellow, and glasses 1, 5, and 7 blue.

The entire disclosure of German priority application P No. 3346686.6 is hereby incorporated by reference.

What is claimed is:

1. A luminescent glass consisting of the composition
  (a)
    2 to 45 mol % alkali metal oxide
    0 to 20 mole % each pf magnesium oxide, calcium oxide, strontium oxide and barium oxide,
  (b)
    40 to 90 mole % silica
    1 to 20 mole % boron oxide
    1 to 10 mole % aluminum oxide, and
  (c) 0.1 to 5 mole % lead oxide
    1 to 5 mole % vanadium pentoxide.

2. A luminescent glass according to claim 1 wherein the glass has the composition
  (a) 3 to 20 mole % alkali metal oxide
  (b)
    60 to 85 mole % silica
    5 to 15 mole % boron oxide
    1 to 5 mole % aluminum oxide, and
  (c)
    0.8 to 2.5 mole % lead oxide
    0.4 to 4 mole % vanadium pentoxide.

3. A luminescent glass according to claim 1 wherein $V_2O_5$ is less than 2 mole %, PbO is less than 2 mole % and the glass emits while light.

4. A luminescent glass according to claim 1 wherein $V_2O_5$ is greater than 1.5 mole %, the PbO content is less than the $V_2O_5$ content and the glass emits.

5. A luminescent glass according to claim 1 wherein $V_2O_5$ is less than 0.5 mole %, the PbO content greater than the $V_2O_5$ content and emits light in the blue region.

* * * * *